Patented May 15, 1945

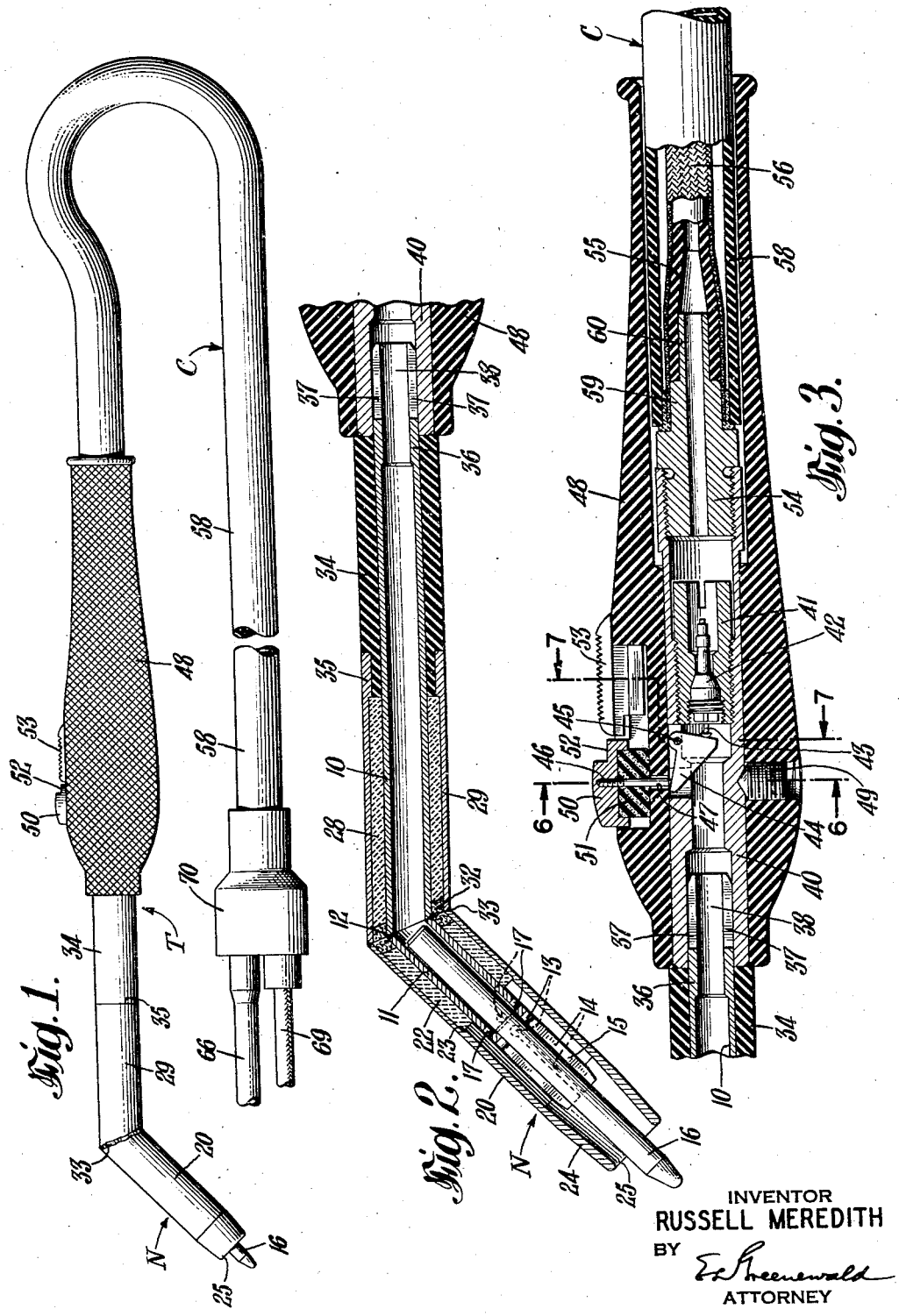

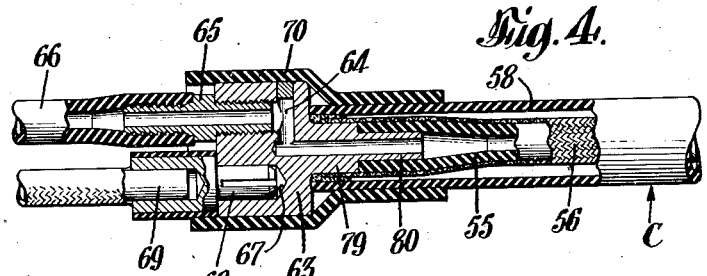
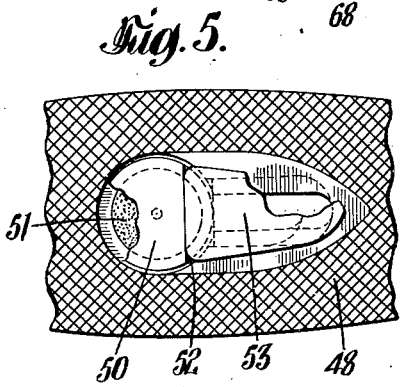
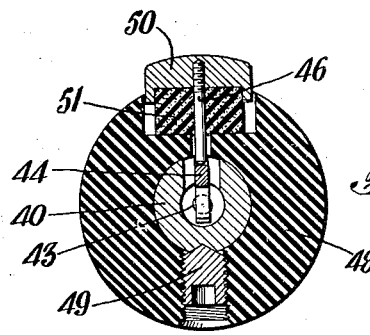
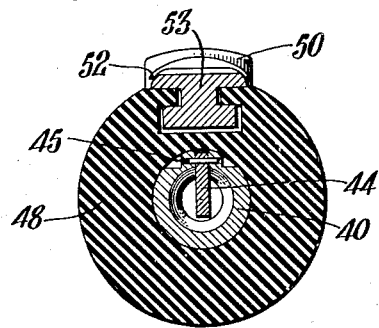
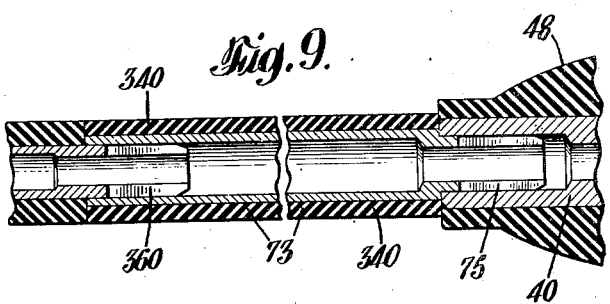
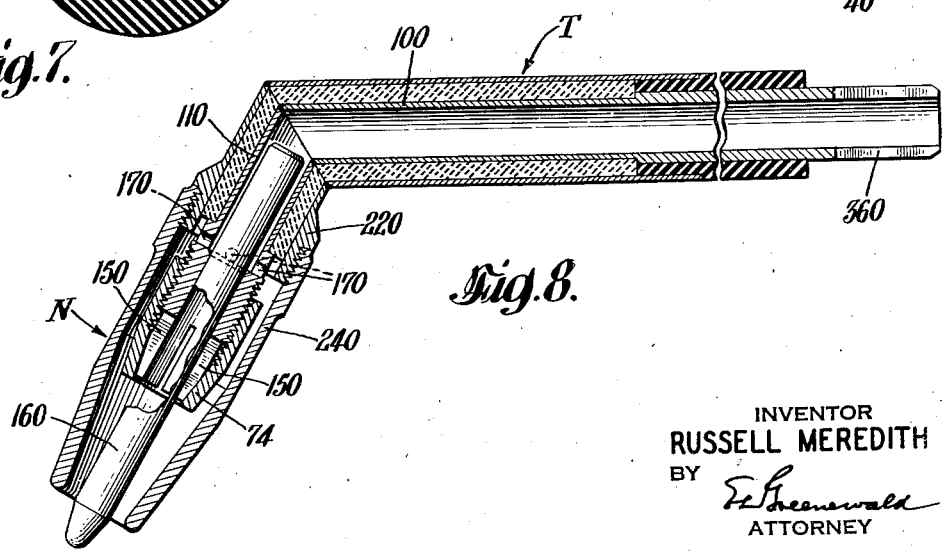

2,376,265

UNITED STATES PATENT OFFICE 2,376,265

INERT GAS BLANKETED ARC WELDING TORCH

Russell Meredith, Los Angeles, Calif., assignor to Northrop Aircraft, Inc., a corporation of California Application February 25, 1943, Serial No. 477,028

12 Claims. (Cl. 219—15)

This invention relates to inert gas blanketed arc welding torches and constitutes an improvement upon my Patent No. 2,274,631 issued February 4, 1942, reference to which is hereby made for the explanation of the problems attendant upon devices of this character.

The main objects of the present invention are to improve the construction and facilitate the operation of devices of this character, and to provide a device which is safe and convenient to manipulate and which will be durable.

In my device described in the patent above referred to, the rear end of the electrode is connected to a current conductor at a point outside of the torch, so that the rear end of the electrode may strike an arc when accidentally brought into contact with surrounding metal. It is a particular object of the present invention to provide a torch of which all parts of the electrode, except the end intended to form the arc, are housed within the torch structure and thereby insulated and protected from accidental arcing with surrounding adjacent metal.

Also, in my said prior device the conductor which supplies the welding current is attached to the electrode outside of the torch, and in consequence the conductor is in the way of the welding operator manipulating the torch. It is another object of the present invention to house within the torch structure the conductor for supplying electric welding current to the electrode.

Still another object is to provide a flexible conduit having a flexible metallic conductor for supplying electric welding current, and a flexible gas-tight passage for supplying inert gas, both housed within a common flexible casing.

Another object of the invention is to provide a convenient and efficient means for holding the electrode, preferably a clutch housed within the torch structure and adapted for convenient adjustment and replacement of the electrode.

Other objects will be apparent as the following description proceeds, with reference to the accompanying drawings of a preferred embodiment of the present invention including the improved conduit for supplying inert gas and electric current to the torch, in which:

Fig. 1 is a side elevation of the improved torch;

Fig. 2 is a longitudinal section of the electrode end of the same;

Fig. 3 is a longitudinal section through the handle, showing the valving arrangement;

Fig. 4 is a cross section through the inlet end of the conduit;

Fig. 5 is a partial plan view of the handle shown in Fig. 3, parts of the valve-operating button being broken away;

Fig. 6 is a cross section taken along the line 6—6 of Fig. 3;

Fig. 7 is a cross section taken along the line 7—7 of Fig. 3;

Fig. 8 is a longitudinal section through the nozzle end of an alternative construction of the torch; and, Fig. 9 is a section of a detail taken near the handle end, showing the connection of the nozzle end of Fig. 8 to the handle.

According to the present invention, the inert gas blanketed arc welding torch comprises a body having a nozzle; a refractory electrode; means for mounting the electrode within but insulated from the torch, in such manner that the outer end of the electrode projects from the nozzle and the inner end of the electrode terminates within the nozzle so as thereby to be housed and insulated against contact with metal adjacent the welding operation; the body of the torch having extending therethrough a passage for inert gas communicating with the nozzle; and, extending through the body, conductor means contacting said electrode for supplying welding current thereto.

The torch of the invention also preferably comprises a conduit for supplying both inert gas and electric welding current to the torch. The means for supplying electric welding current and the means for supplying inert gas are preferably both contained within a common flexible casing. It is desirable to have these internal supply means concentric, or one within the other, so that the outer forms a protection for the inner. The preferred form comprises an inner tube of tough, gas-tight dielectric composition such as rubber or rubber-like synthetic material for conducting the inert gas, a tube of braided metallic conductor such as copper surrounding the inner tube, and an outer casing of gas-tight composition such as a synthetic rubber. The outer casing thus insulates the conductor and forms a second wall or double protection for the gas conduit, while the braided copper forms a flexible conductor, and also reenforces the strength of the gas conduit and forms an armor therefor.

The nozzle which supplies the inert gas to the arc is necessarily close to the arc, both longitudinally and radially of the electrode, in order to economize the amount of inert gas employed. Thus the metal of the nozzle nearest the arc may be subjected to temperatures as high as 1200° F. or even up to 1500° F., a high red heat which is a scaling heat for iron. Hence the metal of the torch, especially the portion of the nozzle nearest the arc, is made of oxidation resistant metal, such as a stainless steel, preferably of the austenitic-chromium-nickel type, or copper or bronze. For the same reasons, the same metals are preferred for the clutch which holds the electrode, inasmuch as corrosion at this point would hamper the replacement of spent electrodes.

In the embodiments of the invention shown in the drawings, the torch is indicated generally at T and the nozzle at N. In the form shown in Fig. 2, a rigid tube 10, preferably of metal, forms the frame of the torch. In order that the nozzle may be disposed at a convenient angle for manipulation, the tube is cut off at an angle, and an extension 11 preferably cut off at the same angle is welded or otherwise joined to the tube 10 as at 12.

The outer end of the extension 11 is apertured as at 13 and slotted as at 14 and compressed to a reduced diameter, forming spring fingers which constitute a clutch 15. The clutch 15 engages and adjustably grips a refractory electrode 16 preferably of refractory metal such as tungsten. The extension 11 is also apertured as at 17 adjacent and behind the clutch 15 for a purpose hereinafter described.

The nozzle N comprises a shell 20, which is of larger diameter than the extension 11, and is radially spaced therefrom. The member 20 houses the clutch 15 and the greater part of the electrode 16 therewithin. In the form shown, an annular bushing 22 of heat insulating material which is also an electrical insulator, for instance a bonded asbestos composition such as "Transite," is fitted over the inner end of the tubular extension 11, and preferably cut off at the same angle. The shell 20 is also cut at the same angle, and fitted over the insulated bushing 22, which engages a shoulder 23 inside the member 20. The outer end of the member 20 is thickened as at 24 and tapered inwardly to a rim 25 which is uniformly radially spaced from the electrode 16, forming an annular outlet or throat therearound.

The tube 10 is surrounded by a bushing 28, of insulation, which is not only non-conducting for electricity, but is also highly heat resistant, preferably an asbestos composition such as "Transite," over which is fitted a tubular shell 29. The bushing 28 engages a shoulder within the shell 29.

In assembly, the bushing 28 and the shell 29 are preferably cut off at the same angle as the tube 10 at the weld 12. At this point, the bushings 22 and 28 are preferably spaced back from the weld 12 and the space therebetween filled with insulating packing 32, for instance asbestos fiber. The shells 20 and 29 are brought together over the packing 32 and the mating edges welded as at 33.

The rear-end of the tube 10 is covered with suitable electrical insulation 34, which is also moderately resistant to heat, such for instance as the phenol aldehyde or urea aldehyde synthetic resins. This insulation is forced under the rim 35 of the shell 29. The rear end of the tube 10 extends beyond the insulation 34 and is thickened as at 36 and apertured and slotted as at 37, to form a projecting spring coupling 38.

The handle shown in Fig. 3 has a frame comprising a tube 40 of metal or other rigid material, which is adapted to fit over and snugly receive the spring coupling 38. The interior of the member 40 is threaded to receive a valve seat member 41 which carries a valve 42 having a stem 43 engaged by a lever 44 pivoted as at 45 to the tubular member 40. The lever 44 is operated by a pin 46 passing through an aperture 7 in the grip member 48 which is of suitable shape and construction to form the handle of the torch device. To secure the grip member in position, and also to facilitate alignment in assembly, a screw 49 carried by the grip member engages a suitable depression in the tube 40.

The pin 46 is carried by button 50 which is cushioned by a block of rubber or other springy material 51. The button 50 has a shoulder 52 which is adapted to be engaged by a slide 53 mounted in the grip 48 in position to slide over the shoulder 52 and thus hold the valve 42 in open position. The rear end of the tubular member 40 is threaded to receive a coupling member 54.

The conduit C for supplying electric welding current and inert gas is best shown in section in Figs. 3 and 4. A tube 55 of gas-tight material, preferably a synthetic rubber, extending lengthwise of the conduit forms a through passage for the inert gas. A flexible conductor 56, also extending lengthwise of the conduit, serves to conduct the electric welding current. The conductor 56 is preferably braided fine metallic wire, such as copper, and in the form shown constitutes a tube surrounding the gas tube 55. Enclosing both the gas tube 55 and the conductor 56 is a protective casing 58, preferably of tubular form. The casing 58 is also preferably constructed of a synthetic rubber, and preferably free of attachment to the conductor 56, so as to allow play to facilitate flexing of the conduit.

One end of the conduit is securely fastened to the coupling member 54. For this purpose the coupling member 54 is reduced in diameter to form a shoulder 59 and a stem 60. The inner gas tube 55 is expanded over the stem 60, and suitably secured in position. The braided conductor 56 is fitted over the shoulder 59 and firmly secured thereto in electrical contact as by soldering or brazing, after which the casing 58 is secured in position over the joint as by rubber cement.

The other end of the conduit terminates in a socket 63 as shown in Fig. 4. This socket is also provided with a shoulder 79 and stem 80, to which the conduit is secured as described for Fig. 3. The body of the socket 63 is provided with an offset passage 64 in communication with the stem 80. A hollow threaded fitting 65 communicates with the other end of the passage 64 and receives the end of a supply tube 66 connected to a source of inert monatomic gas, such as helium or argon.

The socket 63 is also recessed as at 67 to receive a plug 68, by means of which it is connected to a conductor 69, which supplies the electric welding current from a suitable source. The socket 63 is covered by a sleeve 70 of suitable insulation, such as a synthetic rubber.

In operation, with the parts assembled as shown in Fig. 1, the supply pipe 66 being connected to a source of monatomic inert gas, such as helium or argon, and the conductor 69 being connected to a source of welding current, the operator grasping the handgrip 48 directs the electrode 16 toward the inflammable metal to be welded, and strikes an arc. Electric welding current flows from the conductor 69 through the plug 68, socket 63, socket shoulder 79, and along the braided flexible conductor 56. From the conductor 56 the electric welding current flows through the coupling shoulder 59, coupling 54, frame member 40, coupling 38, tubular member 10, extension 11, clutch fingers 15, and the electrode 16, thus forming the arc.

Just prior to striking the arc, the operator presses the button 50, compressing the rubber cushion 51, and moves the slide 53 forward over the shoulder 52, thus holding down the button 50. As the button is pressed, the pin 46 moves the lever 44 about its pivot 45, depressing the stem 43 and opening the valve 42. The inert gas flows from the tube 66, through fitting 65, passage 64, conduit tube 55, coupling 54, tubular member 40, seat member 41, and the remainder of tubular member 40. From the tubular member 40 the inert gas flows through coupling 38, tube 10, extension 11, through the annular space between the electrode and the extension 11, and out through the holes 17 to the interior of the nozzle shell 20 behind the clutch 15, and thence through the throat around the electrode 16 to the region of the arc to blanket the same.

A modified form of torch is shown in Figs. 8 and 9. In this form the electrode 160 is of larger size, and an extension member is interposed between the handle and the torch T to space the handle farther from the nozzle N. Also, the nozzle is made of several pieces screwed together, for convenience in overhaul.

The electrode 160 is mounted within the tubular extension 110 and is engaged by clutch fingers 150. These fingers are tapered, and are tightened by a tapered clutch sleeve 74 which threadedly engages the outer thickened end of the extension 110 in front of or outwardly beyond the holes 170 which, similarly to the holes 17 in the torch shown in Fig. 2, provide gas passage means located behind the clutch fingers 150 to establish communication between the interior of the tubular section 110 and the interior of the nozzle N. With this screw clutch, the spring action of the fingers need not be relied upon for the actual gripping, so that when the clutch sleeve 74 is unscrewed, there is more free play to release the electrode, and the clutch sleeve 74 may be removed entirely to free an electrode which has become lodged.

The outer end of the nozzle is a separate piece 240, which is screwed on to the threaded tubular member 220. The member 240 may be readily moved for access to the screw clutch.

The tubular member 100 terminates in a spring coupling 360 which, as shown in Fig. 9, enters the extension member 73. The extension member 73 has a similar spring coupling 75, which engages the tubular member 40 within the handgrip 48. The extension member 75 is covered with suitable insulation 340. With these distinctions the remainder of the structure shown in Figs. 8 and 9 is identical in construction and operation with the torch previously described.

While various embodiments of my invention have been described in detail, it is to be understood that the invention is not limited to the details disclosed.

I claim:

1. A gas-blanketed arc welding torch, comprising in combination, an electrically-conductive tube constituting both an electric welding current conductor and a gas conduit; electrode-gripping means secured to and electrically in circuit with the gas outlet end of said tube, said electrode-gripping means being constructed and arranged to hold an electrode extending therethrough into said tube and axially in line with but spaced from the inside of said tube; a tubular nozzle secured to but thermally and electrically insulated from said end of said tube and surrounding the entire electrode-gripping means; and gas passage means located behind said electrode-gripping means and establishing communication between the interior of said tube and the interior of said nozzle.

2. A gas-blanketed arc welding torch, as claimed in claim 1, wherein said gas passage means comprises apertures extending radially through the wall of said tube at points located behind said electrode-gripping means.

3. A gas-blanketed arc welding torch, as claimed in claim 1, wherein said electrode-gripping means comprises fingers yieldable to receive an electrode inserted axially therebetween and into said tube, and a clamping nut surrounding and rotatable relatively to said fingers to clamp them against such electrode, said clamping nut being disposed within said tubular nozzle.

4. A gas-blanketed arc welding torch, as claimed in claim 1, wherein said electrically-conductive tube comprises two tubular sections united end-to-end, one of said sections being disposed at an obtuse angle relatively to the other section and constituting the gas outlet end of said tube to which said electrode-gripping means is secured, such angularly disposed gas outlet section being constructed to receive and completely enclose the inner end of an electrode held by said electrode-gripping means.

5. A gas-blanketed arc welding torch, as claimed in claim 1, in combination with a handle comprising an electrically-conductive tubular member for supplying both welding current and gas to said electrically-conductive tube; a gas control valve within said tubular member; and means whereby said electrically-conductive tube may be readily coupled to and uncoupled from said electrically-conductive tubular member.

6. In an inert gas-blanketed arc welding torch comprising a metal tube forming the frame of said torch, a tubular extension joined to said metal tube at an obtuse angle, a nozzle, means for mounting said nozzle in concentric relation to said extension, a refractory electrode of smaller cross-sectional area than the interior of said tubular extension, a clutch on said tubular extension and gripping said electrode, said clutch having an opening of larger internal cross-sectional area than said electrode whereby the rear end of said electrode may be inserted through said clutch into said tubular extension as far as its joint with said metal tube, whereby said electrode may be withdrawn to project out of said nozzle and whereby said electrode may be gripped in adjusted position by said clutch, said metal tube and extension having extending therethrough a passage for inert gas communicating with said nozzle; and said metal tube, said tubular extension and said clutch being in electrical contact to conduct electric welding current to said electrode.

7. In an inert gas-blanketed arc welding torch, a metal tube forming the frame of said torch, a tubular metal extension joined to said tube at an obtuse angle, such joined tube and extension constituting both an electric welding current conductor and a gas conduit, a metal outer shell coaxial with said metal tube, a nozzle comprising a metal shell coaxial with said extension, said metal shells being joined at the same angle as said tube and extension, said joined shells and said joined tube and extension defining an annular space, electrical insulating and heat resisting solid material filling said annular space, a refractory electrode in said nozzle and projecting into and electrically connected to said extension, and gas passage means for delivering gas from the interior of said extension to the interior of said nozzle.

8. In an inert gas-blanketed arc welding torch comprising a body having a hollow handle of electrically insulating material, a metal tube within said handle and forming the frame of said torch, a valve in said metal tube intermediate its ends, a tubular metal extension joined to the front end of said tube at an obtuse angle, said tube and said extension together constituting both an electric welding current conductor and a gas conduit, a hollow nozzle mounted on said tubular extension and electrically insulated therefrom, a refractory electrode mounted in and electrically connected to said tubular extension, said tubular extension having a passage communicating with said nozzle, and means for supplying inert gas and electric welding current to the rear end of said tube, whereby said current flows through said tube and extension to said electrode, and said gas flows through said tube past said valve and through said extension and said passage to said nozzle around said electrode.

9. In an inert gas-blanketed arc welding torch having a front nozzle portion and a disconnectible rear handle portion, said front portion comprising a metal tube having an angular extension with a refractory electrode mounted therein and electrically connected thereto, and a nozzle coaxial with said extension and electrically insulated therefrom, said extension having a passage communicating with said nozzle, the improvement which comprises a rear metal tube forming the frame of said handle portion, a disconnectible mechanical coupling for the mating ends of said tubes, said rear tube having a streamlined handle of electrical insulation thereon, a valve within said rear tube and having a stem coaxial with said nozzle tube, said rear tube extending coaxially with said front tube from said coupling rearwardly to beyond said valve, and means at the rear end of said rear tube for connecting its interior to a source of inert gas and its wall to a source of electric welding current.

10. A gas-blanketed arc welding torch, as claimed in claim 1, wherein said electrode-gripping means comprises an externally threaded portion adjacent said gas outlet end of said tube, and an internally threaded clamping nut surrounding and cooperating with said externally threaded portion to clamp an electrode extending axially through both said externally threaded portion and said nut into said tube.

11. A gas-blanketed arc welding torch, as claimed in claim 1, wherein said electrically-conductive tube comprises two tubular sections united end-to-end, one of said sections being disposed at an angle relatively to the other section and adapted to completely enclose the inner end of an electrode held by said torch, such angularly disposed section having an externally threaded portion and also having gas outlet apertures extending radially therethrough at points located behind said externally threaded portion, and an internally threaded clamping nut surrounding and cooperating with said externally threaded portion to clamp an electrode extending axially through both said externally threaded portion and said nut into said angularly disposed section.

12. In an inert gas blanketed arc welding torch, a metal tube constituting both an electric welding current conductor and a gas conduit; an outer metal shell coaxial with said metal tube and insulated therefrom; a tubular member mounted at an obtuse angle to said metal tube; a nozzle comprising a metal shell coaxial with said tubular member; said metal shells being joined at the same obtuse angle at which said metal tube and tubular member are disposed; a refractory electrode of smaller cross-sectional area than the interior of said tubular member and projecting thereinto; a clutch associated with said tubular member and gripping said electrode, said clutch being constructed and arranged to open to a larger cross-sectional area than said electrode whereby the rear end of said electrode may be inserted past said clutch into said tubular member, said clutch being in electric circuit with said metal tube; said obtuse angularly disposed tubular member being constructed and arranged to receive and completely enclose the inner end of said electrode held by said clutch; and said metal tube and tubular member having gas passage means for conducting inert gas from said tube around said clutch to said nozzle.

RUSSELL MEREDITH.